Feb. 7, 1933.  R. V. H. RUSSELL  1,896,560
CONTACT FINGER FOR ELECTRICAL CONTROLLERS AND SWITCHES
Filed April 15, 1931  3 Sheets-Sheet 1
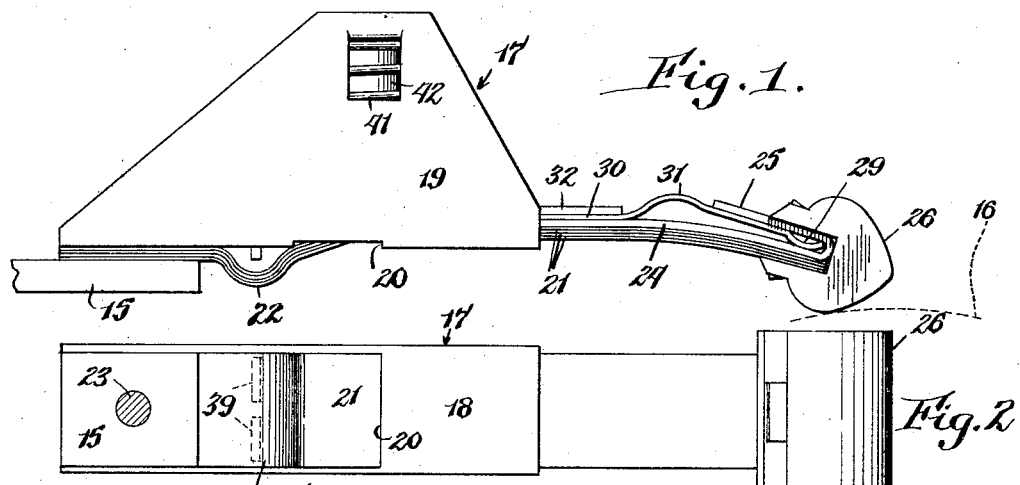
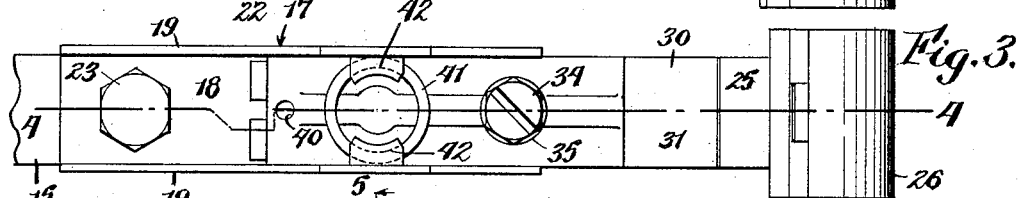
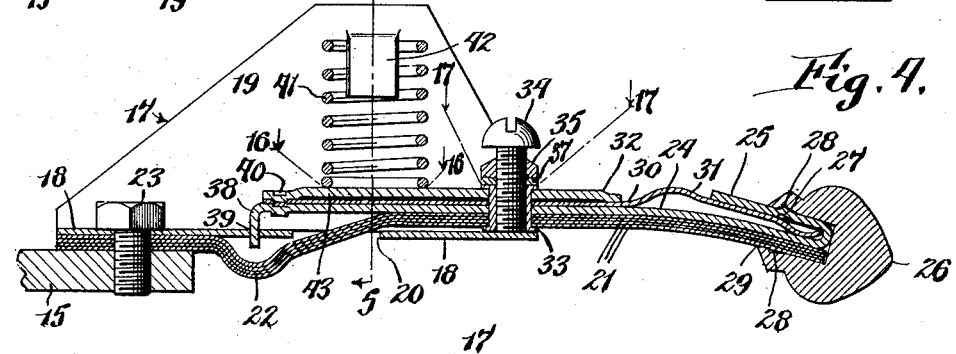
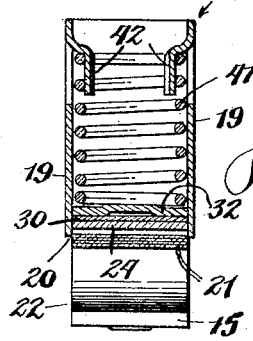
Inventor
Roslyn V. H. Russell
By Popp and Powers
Attorneys

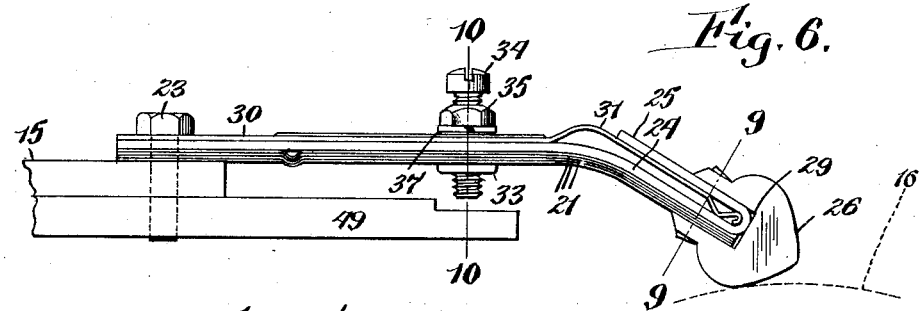
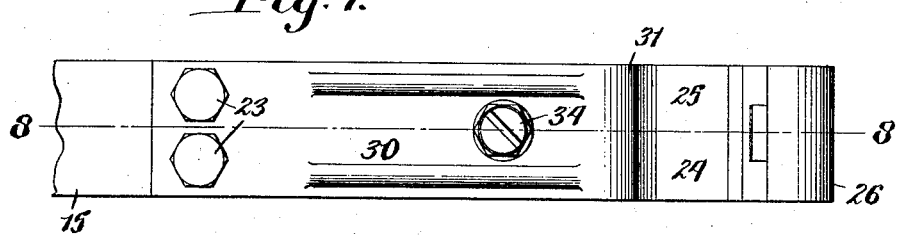
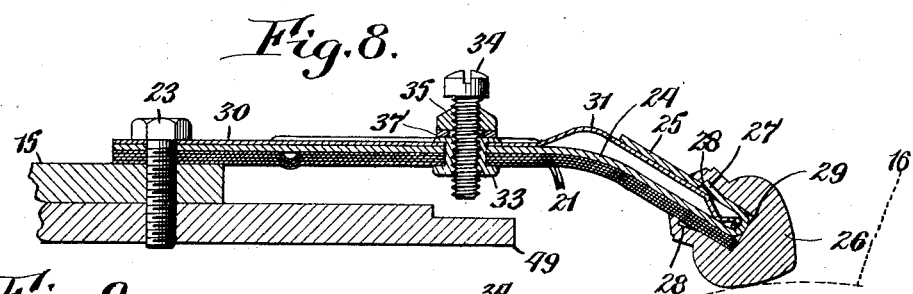
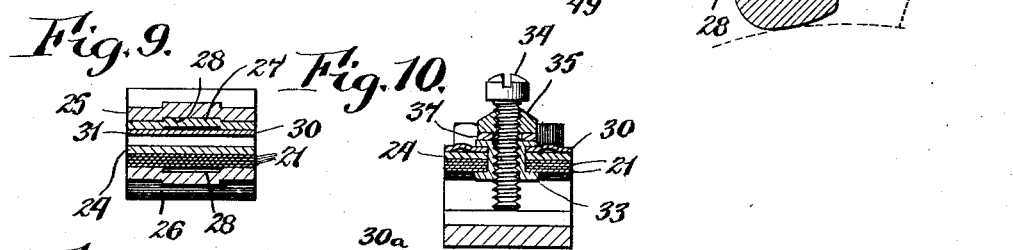
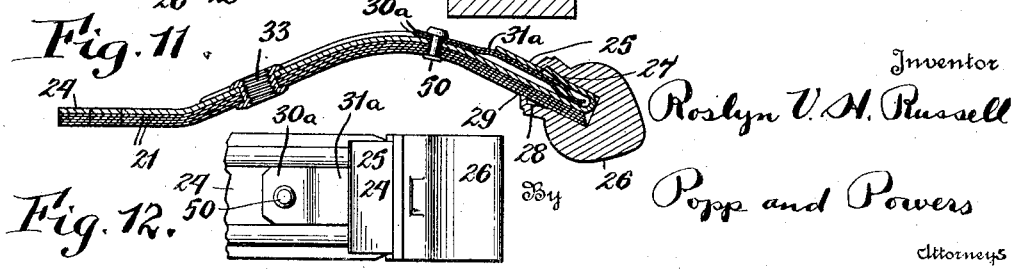

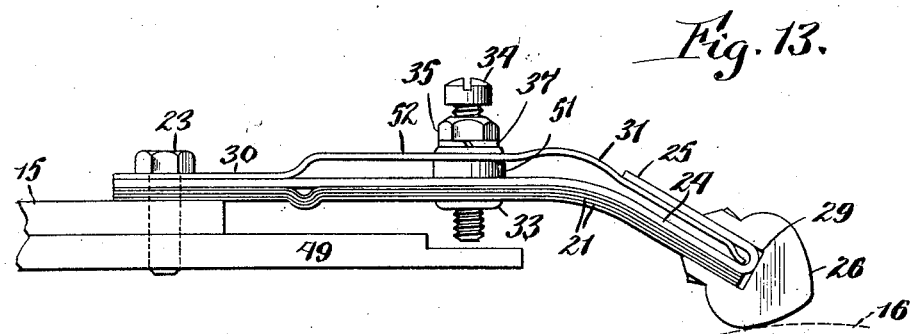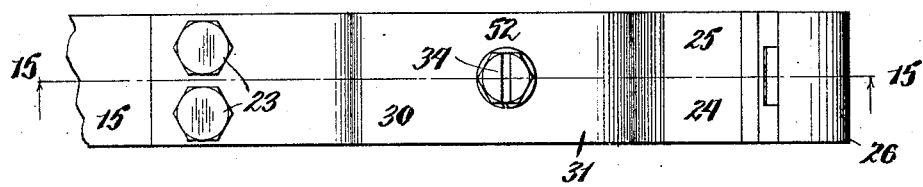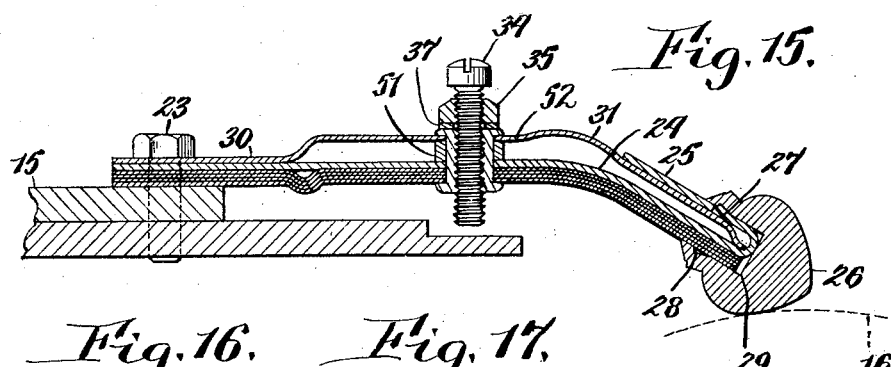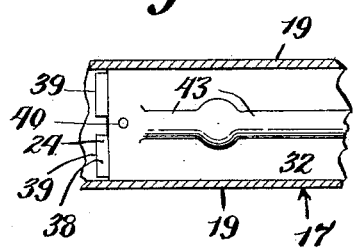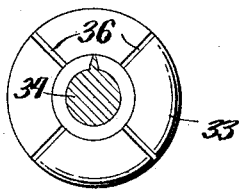

Patented Feb. 7, 1933

1,896,560

UNITED STATES PATENT OFFICE

ROSLYN V. H. RUSSELL, OF NIAGARA FALLS, NEW YORK, ASSIGNOR TO RUSSELL MANUFACTURING CO., OF NEW YORK, N. Y., A COPARTNERSHIP COMPOSED OF RICHARD RUSSELL AND ROSLYN V. H. RUSSELL

CONTACT FINGER FOR ELECTRICAL CONTROLLERS AND SWITCHES

Application filed April 15, 1931. Serial No. 530,175.

This invention relates to a contact finger for electrical controllers or switches, and more particularly to the type of contact finger which is attached to a stationary part of the controller and is provided with a removable contact tip which rides on the controller drum. In operation these controller fingers are flexed continuously and in some installations must also be rockably mounted so that they can follow the surface of the segment of the controller drum. The contact fingers, therefore, take different forms depending upon their particular use.

The principal object of this invention is to provide a contact finger in which the contact tip is fitted on the flexible body and in which spring means are provided for constantly forcing a tight engagement and good electrical contact between the tip and the flexible body and at the same time to so design these spring means that the contact tip can be quickly and easily removed and reversed or replaced without requiring the use of special tools other than a pair of pliers.

Another object is to provide such a finger which has no moving parts in the sense of a sliding or similar part but in which the desired firm contact and good electrical connection between the tip and the flexible body is achieved wholly by the spring which is permanently built into the flexible body structure and cannot drop out or move to a position where it is inoperative.

Another object is to form the flexible body with a loop, the bend of which fits into a recess in the tip and in which the spring means comprise a single arch which is arranged in the loop and exerts an outward pressure on the free leg of the loop and at the same time permits the tip to be removed by simply compressing the sides of the loop together by means of a pair of pliers.

A further aim is to so arrange this auxiliary spring for the contact finger that it strengthens and reinforces the flexible body of the finger and thereby increases its life and durability.

Another purpose is to provide a rocking type of finger in which the holder which rockably supports the finger assembly can be made of steel or other inexpensive sheet metal and electrical connections effected between the electrical conductor and support and the finger assembly directly instead of through the holder as heretofore done.

Another purpose is to provide a rocking support for the contact finger assembly within the sheet metal holder which is extremely simple and can be provided with a minimum of operations on the various parts, thereby adapting it to production methods.

A still further object is to simplify both the construction of the sheet metal holder and the finger assembly so that a rocking type of finger can be made and marketed at low cost.

A further purpose is to provide adjustment screw means including a hollow rivet or collet, a screw, a lock nut and a spring washer in which the collet is so formed that the screw can be screwed and unscrewed into said collet at will while said nut is held against movement and the nut and lock washer yieldingly resist the movement of the screw so that it holds its adjusted position.

Other objects are to provide a contact finger which is simple and inexpensive in construction, reliable in operation and will not get out of order under conditions of severe and constant use.

In the accompanying drawings:

Figure 1 is a side elevation of a contact finger of the locking type in which the contact finger assembly is rockably mounted in a sheet metal holder and the whole mounted on an electrical conductor and support.

Figure 2 is a bottom plan view thereof.

Figure 3 is a top plan view thereof.

Figure 4 is a section taken on line 4—4, Fig. 3.

Figure 5 is a vertical transverse section taken on line 5—5, Fig. 4.

Figure 6 is a side elevation of a non-rocking contact finger mounted on an electrical conductor and support.

Figure 7 is a top plan view of the form of the invention shown in Fig. 6.

Figure 8 is a vertical longitudinal section taken on line 8—8, Fig. 7.

Figures 9 and 10 are sections taken on the correspondingly numbered lines in Fig. 6.

Figure 11 is a view similar to Fig. 8 showing a further modified form of the invention.

Figure 12 is a fragmentary top plan view of the form of the invention shown in Fig. 11.

Figure 13 is a view similar to Fig. 6 showing a form of the invention in which the spring is spaced from the body of the finger to give it more action and also to impart greater strength to the finger.

Figure 14 is a top plan view of the form of the invention shown in Fig. 13.

Figure 15 is a section taken on line 15—15, Fig. 14.

Figures 16 and 17 are fragmentary sections taken on the correspondingly numbered lines in Fig. 4.

Referring to the form of the invention shown in Figs. 1–5, the numeral 15 represents an electrical conductor and support of a controller on which the contact finger is mounted and the numeral 16 represents the segment of a controller drum on which the removable tip of the contact finger rides. The contact finger assembly is rockably mounted in a holder 17 which is made of sheet metal, preferably steel or other inexpensive metal, this holder being U-shaped in form and comprising a bottom 18 and side walls 19. In the bottom 18 of the holder 17 an opening 20 is provided in the holder through which a number of copper laminations 21 of the contact finger assembly extend. These copper laminations 21 have their central part arranged in the holder 17 and their rear ends extend downwardly through the opening 20 in rear of which they are formed to provide a corrugation 22. In rear of the corrugation 22 the copper laminations 20 are arranged against the under side of the bottom wall 18 of the holder and are adapted to be held in contact with the electrical conductor and support 15 of the controller by a screw 23 which extends through an opening provided in all of the copper laminations 21 and also in the bottom of the holder 17.

The front ends of the laminations 20 project outwardly from the holder 17 and over these laminations is arranged a bronze strip 24 which is of substantial thickness and provides the necessary strength and rigidity for the finger, the copper laminations 21, however, forming a better electrical conductor.

The bronze strip 24, which in effect forms another lamination is formed at its front end to provide a loop 25 and the bend of the loop 25 and the corresponding ends of the copper laminations 21 are embraced by a recessed reversible contact tip 26 which is preferably made of copper. An interlock is preferably provided between the loop 25 and the tip 26, this interlock comprising a lip 27 struck up from the free leg of the loop 25 and adapted to enter one of two recesses 28 provided on opposite sides of the recess 29 in the tip 26. From this it is apparent that when the tip 26 becomes worn on one side the free leg of the loop 25 can be compressed toward the body of the contact finger and its lip 27 freed from the recess 28 so that the contact tip 26 can be slid off, reversed and reinserted over the loop 25, the opposite recess 28 thereupon being caught by the lip 27. By this means the life of the tip is doubled.

It has been found desirable to insure a tight fit between the tip 26 and the loop 25 and copper laminations 21 by means other than the normal spring of the loop 25. For this purpose spring means are provided which are carried by the body portion of the finger and extend into the loop 25 and are so formed as to exert an outward pressure on the free leg of the loop 25 and force it into firm engagement with the recess 29 of the contact tip 26. This not only insures against the tip 26 becoming dislodged but also insures a good firm electrical connection for the contact tip. It is desirable, however, that such spring means do not interfere with the easy removability of the tip 26 or in any way complicate this operation.

To meet these requirements the present invention proposes a spring 30 which can be made of bronze or of spring steel and which is secured against the outer side of the bronze strip 24, as hereinafter described and which has an outer free end 31 which is arched and which extends into the loop 25. At its outermost end this spring 30 bears against the bottom of the bronze strip 24 at the innermost end of the loop 25 and may or may not butt against the innermost end of the loop 25 and the apex of the arch 31 bears upwardly against the underside of the free leg of the loop 25. It is therefore apparent that the spring 30 exerts a constant expanding pressure forcing the free leg of the loop 25 outwardly and at the same time by the provision of a single arch 31 a pair of pliers can be applied to the free leg of the loop 25 and to the opposite side of the copper laminations 21 and upon compressing the pliers the free leg of the loop 25 will be moved downwardly, compressing the single arch of the spring 30 and freeing the lip 27 from the recess 28 in the contact tip so that the contact tip can be removed and reversed or replaced as may be required.

On top of the spring 30 is arranged a backing or a follower plate 32 which can be made of any suitable material and this follower plate is preferably permanently joined to the spring 30, the bronze strip 24 and the several copper laminations 21 by a hollow rivet 33 which extends centrally through these members and also carries an adjustment screw 34. The lower end of this adjustment screw bears against the bottom 18 of the holder 17 so that the tension or pressure of the contact tip 26 on the controller drum 16 can be varied as may be required. This screw bears against the central part of the bottom 18 of the holder 17 so that it forms a fulcrum about which the controller finger assembly can rock laterally and the tip 26 thereby adjust itself to the controller drum segment 16.

The adjusting screw 34 has heretofore been provided with the usual lock nut so that when it is adjusted as required it can be locked to hold its adjustment. With the type of lock nut as heretofore used, it was necessary, in the adjustment of the screw 34 to back off the lock nut, adjust the screw 34 and then, while holding the screw in its adjusted position, to tighten the lock nut. This is, of course, a time consuming operation. The present invention proposes an improvement on this adjustment and proposes to form the hollow rivet or collet 33 in such manner that it coacts with a spring washer 37 and a lock nut 35 so as to permit the adjustment of the screw 34 at will and holds the nut 35 against turning while the screw 34 is being so adjusted while at the same time the lock nut 35 and the spring washer 37 impose sufficient resistance at all times to the turning of the screw 34 so that it holds any position to which it is adjusted and prevents the screw 34 from losing its adjustment even under the vibration to which it is subjected.

For this purpose, when the collet 33 is being driven home, at least one, and preferably four as shown, radial notches 36 are formed in the upper face of the collet 33 as best shown in Fig. 17. The spring washer 37 is arranged against this face in the assembly of the parts and over the spring washer 37 the nut 35 is disposed. In assembling the parts the nut 35 is tightened down to exert a moderate pressure on the spring washer 37 and in doing so the spring washer 37 is turned until its downwardly offset end engages one of the radial notches 36 in the collet 33. When this occurs, the lock washer 37 is held against turning relative to the collet 33 and the nut 35 is likewise held against turning, through vibration or other accidental causes, relative to the collet 33 also at the same time there is sufficient give so that the screw 34 can be screwed or unscrewed at will to adjust it. As the nut 35 is held stationary, however, it does not back off when the screw 34 is unscrewed nor does it jam when the screw is tightened but at all times resists the movement of the screw to a degree depending on how hard it is tightened down. This resistance to the action of the screw has been found to be entirely sufficient to hold the screw in its adjusted position even when the finger is subjected to constant vibration which tends to loosen all parts.

In order to anchor the finger assembly in the holder 17 and still permit of its rocking, the rear end of the bronze strip or lamination 21 is bifurcated to provide two depending lips 38 which fit into holes 39 in the bottom 18 of the holder 17. These holes 39 are arranged in rear of the opening 20 and immediately above the corrugation 22 and the fingers 38 fit into these openings and also into the corrugation 22. It is apparent that the lips 38 prevent all fore and aft displacement of the finger assembly and at the same time permit the finger assembly to rock laterally about the adjusting bolt 34 as a fulcrum. These fingers fitting in the holes 39 also form the fulcrum about which the finger assembly rocks up and down and sidewise and form the sole fulcrum, the finger assembly from this fulcrum to the tip being entirely rigid.

In addition to securing the follower plate 32, spring 30, bronze strip 24 and copper laminations 21 together by the hollow rivet 33, the follower 32, spring 30 and copper strip 24 are preferably held together at their rear ends so that relative displacement of these elements is prevented. The simplest means for this purpose comprise driving a punch into the rear end of the follower plate 32 so as to leave a recess 40 in the follower plate 32 and also displace the metal of this follower plate into the spring 30 and the metal of the spring 30 into the bronze strip 24. In other words, by applying the punch to the rear ends of the plate, spring and bronze strip the metal is so displaced as to provide a teat in each of these elements and also a recess in the adjacent element which receives the corresponding teat. By this means it is apparent that the plate 32, spring 30 and bronze strip 24 are held in proper position by merely offsetting the metal of each.

The finger assembly just described is held down by a helical compression spring 41 which bears against the upper side of the follower plate 32. The uppermost coils of this helical compression spring 41 are caught under a finger 42 which is struck inwardly from each side wall 19 of the metal holder, as best shown in Figure 5, and, as best shown in Fig. 16, the lower coil of this spring 41 bears on a longitudinal ridge or corrugation 43 in the plate 32. This longitudinal ridge or corrugation 43 permits the free lateral rocking movement of the finger assembly without being resisted by the spring 41 since the sides of the lower coil of the spring are held away from the upper face of the plate 32. It is apparent that the simple expedient of striking in the fingers 42 from the opposite side walls 19 of the holder 17 provides a very simple and reliable means for anchoring the compression spring 41 to the holder.

From the foregoing description of the form of the invention shown in Figures 1–5 it is apparent that there is a direct electrical contact between the copper laminations 21 of the finger assembly and the electrical conductor and support 15 of the controller so that the electrical current is not required to pass through the body of the holder 17 as has been the practice heretofore. By this means the holder 17 can be made of steel instead of bronze or other metal of higher conductivity as has been required heretofore. It is also apparent that the tip 26 is easily removable and reversible without requiring any special tools other than a pair of pliers and at the same time a constant strong spring pressure is exerted against the free leg of the loop 25 so as to insure a good electrical connection for the tip 26. It will also be noted that by the simple provision of a depending finger at the rear end of the bronze strip 24 not only is the finger assembly held against longitudinal displacement relative to the holder 17 but the lips 38 also provide a fulcrum about which the finger rocks sidewise and up and down and which takes over the thrust of the controller drum segment. The follower plate and spring are also securely held to the bronze strip 24, both by the hollow rivet 33 and at their rear ends are held against relative displacement by punching or indenting these members, one into the other. The helical compression spring 41 is also securely fastened to the holder 17 by the simple expedient of providing indented depending fingers 42 at the sides of the sheet metal holder 17.

The form of the invention shown in Figures 6-11 is a non-rocking type of contact finger and is, therefore, substantially identical with the contact finger assembly shown in Figures 1-5 but stripped of the holder and rocking connection between the finger assembly and the holder.

As in the form of the invention shown through Figures 1-5 the contact finger comprises a series of copper laminations 21 overlaid by a bronze lamination 24 which is formed to provide a loop 25. This loop has a projection 27 punched up therefrom which interlocks with a recess 28 provided on opposite sides of a recess in the contact tip 26. The contact tip 26 fits over the ends of the laminations 21 and also the bend of the loop 25. As in the form of the invention shown in Figures 1-5 a spring 30 overlays the bronze strip 24, this spring, the bronze strip and the copper laminations 21 being held together at their centers by a hollow threaded rivet 33. At its outer end the spring 30 is arched as indicated at 31, the ends of the arch bearing on the body part of the bronze strip 24 and, if desired, butting against the innermost end of the loop 25 and the apex bearing against the outer end of the free leg of the loop 25 so that when a pair of pliers is applied to the free leg of the loop 25 the arch 31 will be compressed and the free leg of the loop 25 permitted to move sufficiently to release the interlock 27, 28. At the same time the arch 31 of the spring presses outwardly on the free leg of the loop 25 and holds it in firm electrical engagement with the tip 26.

At the rear end of the finger one or more holes are provided extending through the spring 30, bronze strip 31 and copper laminations 22 and one or more bolts 23 pass through these holes and secure the finger in good electrical contact with the electrical conducting support 15 of the controller.

For the purpose of adjusting the tension of the finger on the segment 16 of the drum the adjustment screw 32 screws into the hollow rivet 33 as in the construction shown in Figures 1-5, and this screw is adapted to engage a shelf 49 projecting outwardly from the support 15. As in the construction shown in Figures 1-5 the screw 34 is held in its adjusted position by a lock nut 35 and a lock washer 37 the collet 33 being provided with the radial indentations or grooves 36 to catch the ends of the spring washer 37 as in the form of the invention shown in Figs. 1-5 so that the screw 34 can be screwed or unscrewed at will, resisted to a degree by the nut and spring washer combination which are held against turning by the radial notches 36.

The form shown in Figures 11 and 12 is substantially identical with the form shown in Figures 6-10 except that instead of having a long spring 30 extending the full length of the contact finger one or more short springs 30a are provided which are secured to the bronze and copper laminations 24 and 21 by a rivet 50. This spring 30a has an arch 31a which is substantially similar to the arch 31 shown in connection with the other forms of the invention and thereby achieves the same result of holding the loop 25 in firm electrical contact with the tip 26 and at the same time permitting the legs of the loop 25 to be compressed together so as to release the tip 26 when it is desired to reverse or replace the same.

In Figs. 12-15 is illustrated a still further modification of the present invention. This form is substantially identical to the form shown in Figs. 6-10 except that the spring 30 is spaced from the body of the bronze strip 24 by a spacer 51 which is disposed around the shank of the adjustment screw 34 and forms a strut or pier for holding the central part 52 of the spring 30 in an elevated position, the rear end of this spring being held down by the bolts 23 and the front end projecting under and exerting an upward pressure on the loop 25. The front end of this spring may or may not butt against the innermost end of the loop 25. This last construction has two important advantages over the form shown in Figs. 6-10. In the first place the full length of the spring from the strut or pier 51 to the innermost end of the loop 25 is available for use as an arch to yieldingly force the legs of the loop 25 apart and at the same time permit their compression together by means of a pair of pliers. This permits the invention to be applied to very short fingers and also permits lighter springs 30 and springs of materials other than steel or like strong material to be employed. In the second place the use of the pier 51 also greatly strengthens the finger as it forms a truss for the greater part of the length of the finger. By actual test a finger made as shown in Figs. 13-15 has been found to be several pounds stronger than that shown in Figs. 6-10 when embodied in a standard sized finger.

As a whole all of the forms of this invention provide a contact finger for electrical controllers which is of extremely simple, inexpensive and rugged construction and contains no moving parts, and in which the tip is removably and reversibly held in good electrical contact on the finger and at the same time can be quickly and easily removed and reversed by the simple application of a pair of pliers to the loop on which it is held. The invention also is applicable to all types of controller fingers, that is non-rocking flexing fingers and also the rocking type of finger shown in Figures 1-5 and when embodied in the rocking type of controller finger can be so mounted on the holder as to provide the desired rocking connection with the minimum of machining operations and with the smallest amount of expensive materials. In all forms the finger can be easily taken apart, adjusted and repaired and all forms of the invention will stand up under severe and constant use and give satisfactory service for a long time without requiring renewal or replacement of the parts.

I claim as my invention:

1. The combination with a contact finger having one of its ends bent back to form a loop and a contact tip having a recess adapted to embrace the bend of said loop, of a spring arranged in said loop and yieldingly forcing the loop legs into engagement with said recess, said spring being formed to yieldingly permit the legs of said loop to be intentionally compressed together whereby said tip can be removed and replaced on said loop.

2. The combination with a contact finger having a body portion, one end of which is bent back to form a loop and a free leg and a contact tip having a recess adapted to embrace the bend of said loop and a portion of said leg, comprising a spring arranged in said loop and reacting against said body portion and that part of said free leg extending beyond said tip, said spring being formed to permit said free leg to be intentionally forced toward said body whereby said tip can be removed and replaced on said loop.

3. The combination with a contact finger having one of its ends bent back to form a loop and a contact tip having a recess adapted to embrace the bend of said loop, of a spring arranged in said loop and forcing the loop legs into engagement with said recess, and means for securing said spring to the finger, said spring being formed to yieldingly permit the legs of said loop to be intentionally compressed together whereby said tip can be removed and replaced on said loop.

4. The combination with a contact finger having one of its ends bent back to form a loop and a contact tip having a recess adapted to embrace the bend of said loop, of a leaf spring having a single effective spring arch bearing against the inner sides of the legs of said loop and yieldingly forcing the loop legs into engagement with the recess, said single effective arch being compressible upon intentionally forcing said loop legs together to permit of the removal and replacement of said tip.

5. The combination with a contact finger composed of a body portion and having one of its ends bent back to form a loop having a free leg and a contact tip adapted to embrace the bend of said loop, of a leaf spring having a single effective spring arch, the apex of said arch bearing against the inner side of said free leg and the ends of said arch bearing against the inner side of said body thereby to force said free leg into engagement with said recess, said single effective arch being compressible upon intentionally forcing said free leg inwardly to permit of the removal and replacement of said tip.

6. The combination with a contact finger composed of a body portion having one of its ends bent back to form a loop having a free leg and a contact tip adapted to embrace the bend of said loop, of a spring secured to said body portion at a place outside of said loop and having a free end projecting into said loop and exerting an outward pressure on said free leg thereby to force said free leg into engagement with said recess and the free end of said spring being formed to permit the intentional compression of said free leg toward said body portion to permit of the removal and replacement of said tip.

7. The combination with a contact finger comprising a body portion having one of its ends bent back to form a loop and a contact tip having a recess adapted to embrace the bend of said loop, of a spring secured at an intermediate part to an intermediate part of said body portion and having a free end projecting into said loop and exerting an outward pressure on the free end of said loop thereby to force the loop into engagement with said recess and the free end of said spring being formed to permit the intentional compression of said free end of said loop toward said body portion to permit of the removal and replacement of said tip and the end of said spring opposite from said free end being adapted to be secured to the corresponding end of said body portion.

8. The combination with a contact finger composed of a number of laminations held together at their center by a hollow rivet which rivet is threaded to receive an adjusting screw and one of said laminations at one end being bent back to form a loop and a contact tip having a recess adapted to embrace said loop, of a spring secured to said finger at its center by said hollow rivet and having a free end projecting into said loop and exerting an outward pressure on the free end of said loop thereby to force the loop into engagement with said recess and the free end of said spring being formed to permit the intentional compression of said loop to permit the removal and replacement of said tip and the end of said spring opposite said free end being adapted to be secured to the corresponding end of said body portion.

9. The combination with a contact finger composed of a number of laminations held together at their center by a hollow rivet which rivet is threaded to receive an adjusting screw and one of said laminations at one end being bent back to form a loop and a contact tip having a recess adapted to embrace said loop, of a spring secured to said finger at its center by said hollow rivet and having a free end projecting into said loop and said free end being provided with a single arch, the apex of said arch exerting an outward pressure on the free end of said loop thereby to force the loop into engagement with said recess and permitting the compression of said loop to permit the removal and replacement of said tip and the end of said spring opposite said free end being adapted to be secured to the corresponding ends of said finger laminations.

10. The combination of a holder and a contact finger assembly rockably carried by said holder, said finger assembly comprising a plurality of laminations arranged within said holder and projecting outwardly therefrom, and a contact tip arranged at one end of said laminations, one of said laminations being formed at its end opposite said tip to provide a lip projecting into and closely confined in a recess in said holder and spring means interposed between said holder and contact finger assembly.

11. The combination of a holder and a contact finger assembly rockably carried by said holder, said finger assembly comprising a plurality of laminations arranged within said holder and projecting outwardly therefrom, one of said laminations being bent back to form a loop, a contact tip having a recess adapted to embrace the bend of said loop, a spring arranged along side of said looped lamination and having one end arranged in said loop and exerting an outward pressure on said loop to force the loop into engagement with said recess, one of said laminations and said holder being also formed at the end opposite said loop to provide a closely fitting lip and recess connection therebetween and spring means interposed between said holder and finger assembly and holding said lip and recess connection in operative relation.

12. The combination of a holder and a contact finger assembly rockably carried by said holder, said finger assembly comprising a plurality of laminations arranged within said holder and projecting outwardly therefrom, one of said laminations being bent back to form a loop, a contact tip having a recess adapted to embrace the bend of said loop, a spring arranged along side of said looped lamination and having one end arranged in said loop and exerting an outward pressure on said loop to force the loop into engagement with said recess, the end of said spring within said loop being formed to permit said loop to be intentionally compressed to permit the removal and replacement of said tip, one of said laminations and said holder being also formed at the end opposite said loop to provide a closely fitting lip and recess connection therebetween and spring means interposed between said holder and finger assembly and holding said lip and recess connection in operative relation.

13. The combination of a holder and a contact finger assembly rockably carried by said holder, said finger assembly comprising a strip of metal having an intermediate part arranged in said holder and having one end extending through an opening in said holder and lying against the outside thereof and having its opposite end extending outwardly from said holder and a contact tip having a recess secured to the outwardly projecting end of said strip of metal and spring means in said holder and interposed between said holder and the part of said strip of metal arranged in said holder.

14. The combination of a holder and a contact finger assembly rockably carried by said holder, said finger assembly comprising a strip of metal having an intermediate part arranged in said holder and having one end extending through an opening in said holder and lying against the outside thereof and having its opposite end extending outwardly from said holder and a contact tip secured to the outwardly projecting end of said strip of metal and spring means in said holder and interposed between said holder and the part of said strip of metal arranged in said holder and said holder and the part of said strip of metal extending along its outer side being adapted to receive a fastening extending therethrough for fastening the strip of metal against the face of a supporting electrical conductor.

15. The combination of a holder and a contact finger assembly rockably carried by said holder, said finger assembly comprising a series of laminations having an intermediate part arranged in said holder and having one end extending through an opening in said holder and lying against the outside thereof and having the opposite end extending outwardly from said holder and the outer end of one of said laminations being bent back to form a loop, a contact tip having a recess adapted to embrace the ends of said laminations at said loop, a spring extending along one side of said looped lamination and having one end arranged in said loop and formed to exert an outward pressure thereon whereby said loop is held in engagement with said recess, means at the opposite end of said spring for connecting it directly with said holder and spring means in said holder and interposed between said finger assembly and said holder.

16. The combination of a holder and a contact finger assembly rockably carried by said holder, said finger assembly comprising a series of laminations having an intermediate part arranged in said holder and having one end extending through an opening in said holder and lying against the outside thereof and having the opposite end extending outwardly from said holder and the outer end of one of said laminations being bent back to form a loop, a contact tip having a recess adapted to embrace the ends of said laminations at said loop, a spring extending along one side of said looped lamination and having one end arranged in said loop and formed to exert an outward pressure thereby said loop is held in engagement with said recess, means at the opposite end of said spring for connecting it with said holder, a follower plate arranged against the outer face of said spring, a fastening extending through the central parts of said follower plate, spring and laminations, means at the ends of said last elements within said holder for holding them against displacement comprising a central offset of the metal of said follower, spring and looped lamination forming interfitting teats and recesses in each, and spring means in said holder and interposed between said finger assembly and said holder.

17. The combination of a sheet metal holder having a bottom and side walls rising from said bottom and a contact finger assembly rockably carried by said holder, said finger assembly comprising a series of laminations having an intermediate part arranged in said holder and having their rear ends extending through an opening in the bottom of said holder and formed to provide a corrugation and a flat rear end part arranged against the under side of the bottom of said holder and the opposite end of said laminations extending outwardly from said holder, the uppermost of said laminations being bent back to form a loop, a contact tip having a recess adapted to embrace the ends of said laminations at said loop, a spring arranged along side of said looped lamination and having one end arranged in said loop and formed to exert an outward pressure thereon whereby said loop is held in engagement with said recess, the opposite end of said looped lamination being formed to provide a downwardly extending projection extending through an opening in the bottom of said holder and into said corrugation and a compression spring secured at its upper end to said side walls and bearing downwardly on said finger assembly.

18. The combination with a contact finger composed of at least one strip of metal having one of its ends bent back to form a loop and a contact tip having a recess adapted to embrace the bend of said loop of a strut mounted on an intermediate part of said strip of metal and a spring carried by said strut and spaced from said strip, the end of said spring being arranged in said loop and yieldingly forcing the loop legs into engagement with said recess, said spring being formed to yieldingly permit the legs of said loop to be intentionally compressed together whereby said tip can be removed and replaced on said loop.

19. The combination with a contact finger composed of at least one strip of metal having one of its ends bent back to form a loop and a contact tip having a recess adapted to embrace the bend of said loop of an auxiliary spring of arch form arranged over said strip and engaging its front and rear ends with the corresponding ends of said main spring, a strut connecting the elevated part of said arch of said auxiliary spring with the adjacent part of said strip, the front end of said arch projecting into said loop and terminating adjacent its innermost end, said arch exerting an outward pressure on one leg of said loop to hold said loop in engagement with said recess and permitting the legs of said loop to be intentionally compressed together whereby said tip can be removed and replaced on said loop.

In testimony whereof I hereby affix my signature.

ROSLYN V. H. RUSSELL.